(12) United States Patent
Belskikh et al.

(10) Patent No.: US 12,277,639 B2
(45) Date of Patent: Apr. 15, 2025

(54) GENERATING VIRTUAL HAIRSTYLE USING LATENT SPACE PROJECTORS

(71) Applicant: Snap Inc., Santa Monica, CA (US)

(72) Inventors: Aleksandr Belskikh, London (GB); Menglei Chai, Los Angeles, CA (US); Antoine Chassang, London (GB); Anna Kovalenko, London (GB); Pavel Savchenkov, London (GB)

(73) Assignee: Snap Inc., Santa Monica, CA (US)

( * ) Notice: Subject to any disclaimer, the term of this patent is extended or adjusted under 35 U.S.C. 154(b) by 152 days.

(21) Appl. No.: 18/149,007

(22) Filed: Dec. 30, 2022

(65) Prior Publication Data

US 2024/0221259 A1   Jul. 4, 2024

(51) Int. Cl.
*G06T 13/40* (2011.01)
*G06N 3/094* (2023.01)
*G06T 19/00* (2011.01)

(52) U.S. Cl.
CPC ............. *G06T 13/40* (2013.01); *G06N 3/094* (2023.01); *G06T 19/006* (2013.01)

(58) Field of Classification Search
CPC .............. G06T 13/40; G06T 19/006; H04N 2005/2726; G06N 3/094; G06N 3/0455; G06N 3/0475
See application file for complete search history.

(56) References Cited

U.S. PATENT DOCUMENTS

| 11,995,781 B2 * | 5/2024 | Bondich | G06N 3/088 |
| 12,051,155 B2 * | 7/2024 | Hajmohammadi | G06T 19/20 |
| 2022/0284646 A1 | 9/2022 | Saha et al. | |
| 2023/0154088 A1 * | 5/2023 | Duarte | G06T 5/50 345/473 |

OTHER PUBLICATIONS

"International Application Serial No. PCT US2023 085106, International Search Report mailed May 31, 2024", 5 pgs.
"International Application Serial No. PCT US2023 085106, Written Opinion mailed May 31, 2024", 5 pgs.
Chai, Menglei, "Neural Hair Rendering", arxiv.org, Cornell University Library, 201 Olin Library Cornell University Ithaca, NY 14853, (Jul. 21, 2020), 18 pgs.

(Continued)

*Primary Examiner* — Antonio A Caschera
(74) *Attorney, Agent, or Firm* — Schwegman Lundberg & Woessner, P.A.

(57) ABSTRACT

Embodiments enable virtual hair generation. The virtual hair generation can be performed by generating a first image of a face using a GAN model, applying 3D virtual hair on the first image to generate a second image with 3D virtual hair, projecting the second image with 3D virtual hair into a GAN latent space to generate a third image with virtual hair, performing a blend of the virtual hair with the first image of the face to generate a new image with new virtual hair that corresponds to the 3D virtual hair, training a neural network that receives the second image with the 3D virtual hair and provides an output image with virtual hair, and generating using the trained neural network, a particular output image with hair based on a particular input image with 3D virtual hair.

20 Claims, 11 Drawing Sheets

(56) References Cited

OTHER PUBLICATIONS

Fan, Wanling, "HSEGAN: Hair Synthesis and Editing Using Structure-Adaptive Normalization on Generative Adversarial Network", IEEE International Conference on Image Processing (ICIP), IEEE, (Sep. 19, 2021), 1324-1328.

Qiu, H, "Two-phase Hair Image Synthesis by Self-Enhancing Generative Model", Computer Graphics Forum : Journal of the European Association for Computer Graphics, Wiley-Blackwell, Oxford, vol. 38, No. 7, (Nov. 14, 2019), 403-412.

Wei, Lingyu, "Real-Time Hair Rendering Using Sequential Adversarial Networks", Sat 2015 18th International Conference, Austin, TX, USA, Sep. 24-27, 2015; [Lecture Notes in Computer Science; Lect.Notes Computer], Springer, Berlin, Heidelberg, (Oct. 6, 2018), 105-122.

\* cited by examiner

GENERATING VIRTUAL HAIRSTYLE USING LATENT SPACE PROJECTORS

BACKGROUND

With the increased use of digital images, affordability of portable computing devices, availability of increased capacity of digital storage media, and increased bandwidth and accessibility of network connections, digital images have become a part of the daily life for an increasing number of people.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
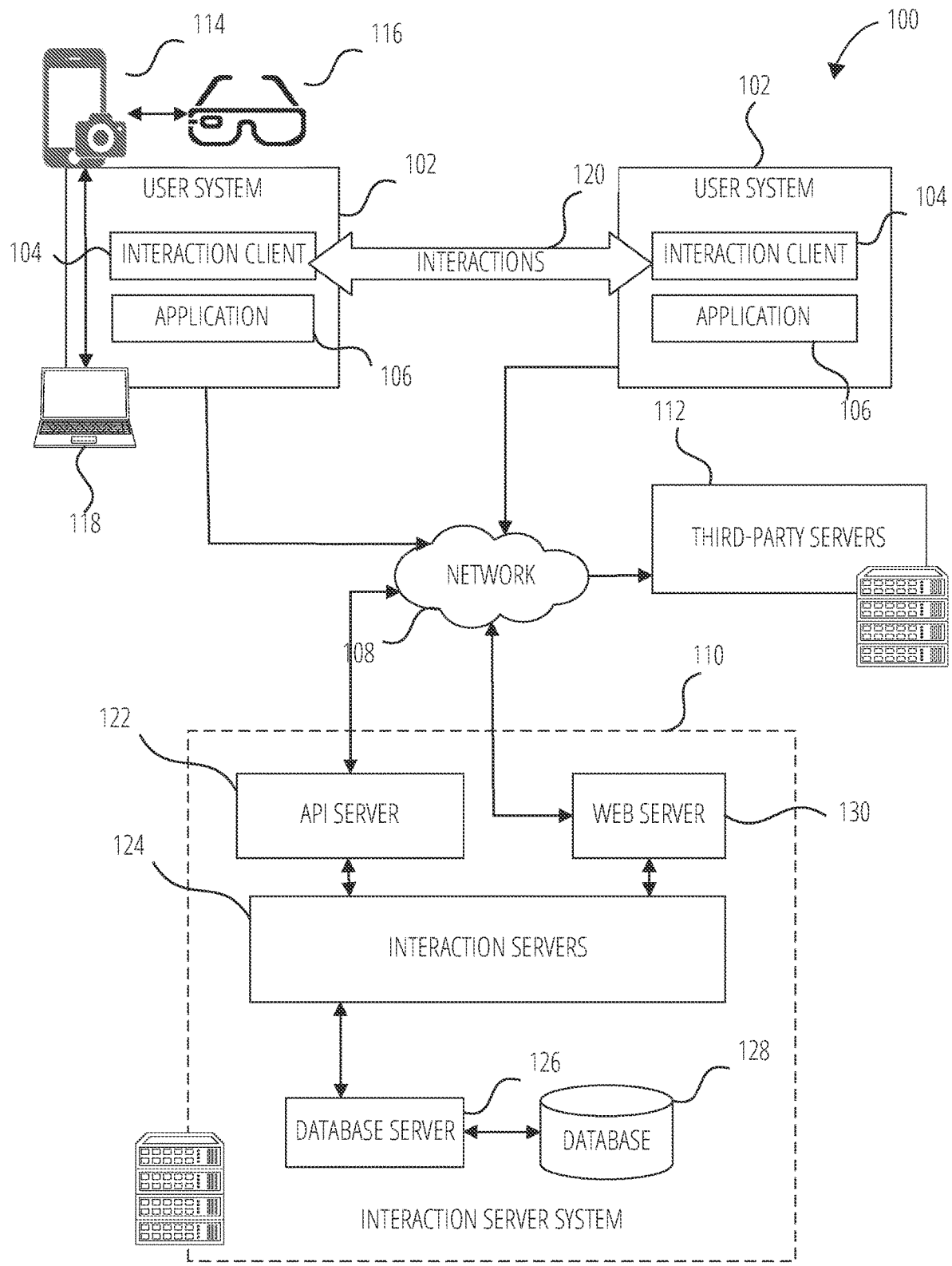
FIG. 1 is a diagrammatic representation of a networked environment in which the present disclosure may be deployed, according to some examples.

Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Augmented reality technology aims to bridge a gap between virtual environments and a real world environment by providing an enhanced real world environment that is augmented with electronic information. As a result, the electronic information appears to be part of the real world environment as perceived by a user. In an example, augmented reality technology further provides a user interface to interact with the electronic information that is overlaid in the enhanced real world environment.

As mentioned above, with the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Embodiments of the subject technology enable virtual hair generation that may include generating virtual hair for applying to a head of an individual in a video or an image. The virtual hair generation can be used for manipulation of content in many applications, such as entertainment shows, computer games, video conversations, virtual reality, augmented reality, and the like.

Messaging systems are frequently utilized and are increasingly leveraged by users of mobile computing devices, in various settings, to provide different types of functionality in a convenient manner. As described herein, the subject messaging system comprises practical applications that provide improvements in capturing image data and rendering AR content (e.g., images, videos, and the like) based on the captured image data by at least providing technical improvements with capturing image data using power and resource constrained electronic devices. Such improvements in capturing image data are enabled by techniques provided by the subject technology, which reduce latency and increase efficiency in processing captured image data thereby also reducing power consumption in the capturing devices.

As discussed further herein, the subject infrastructure supports the creation and sharing of interactive media, referred to herein as messages including 3D content or AR effects, throughout various components of a messaging system. In example embodiments described herein, messages can enter the system from a live camera or via from storage (e.g., where messages including 3D content and/or AR effects are stored in memory or a database). The subject system supports motion sensor input, and loading of external effects and asset data.

As referred to herein, the phrase "augmented reality experience," "augmented reality content item," "augmented reality content generator" includes or refers to various image processing operations corresponding to an image modification, filter, AR content generators, media overlay, transformation, and the like, and additionally can include playback of audio or music content during presentation of AR content or media content, as described further herein.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
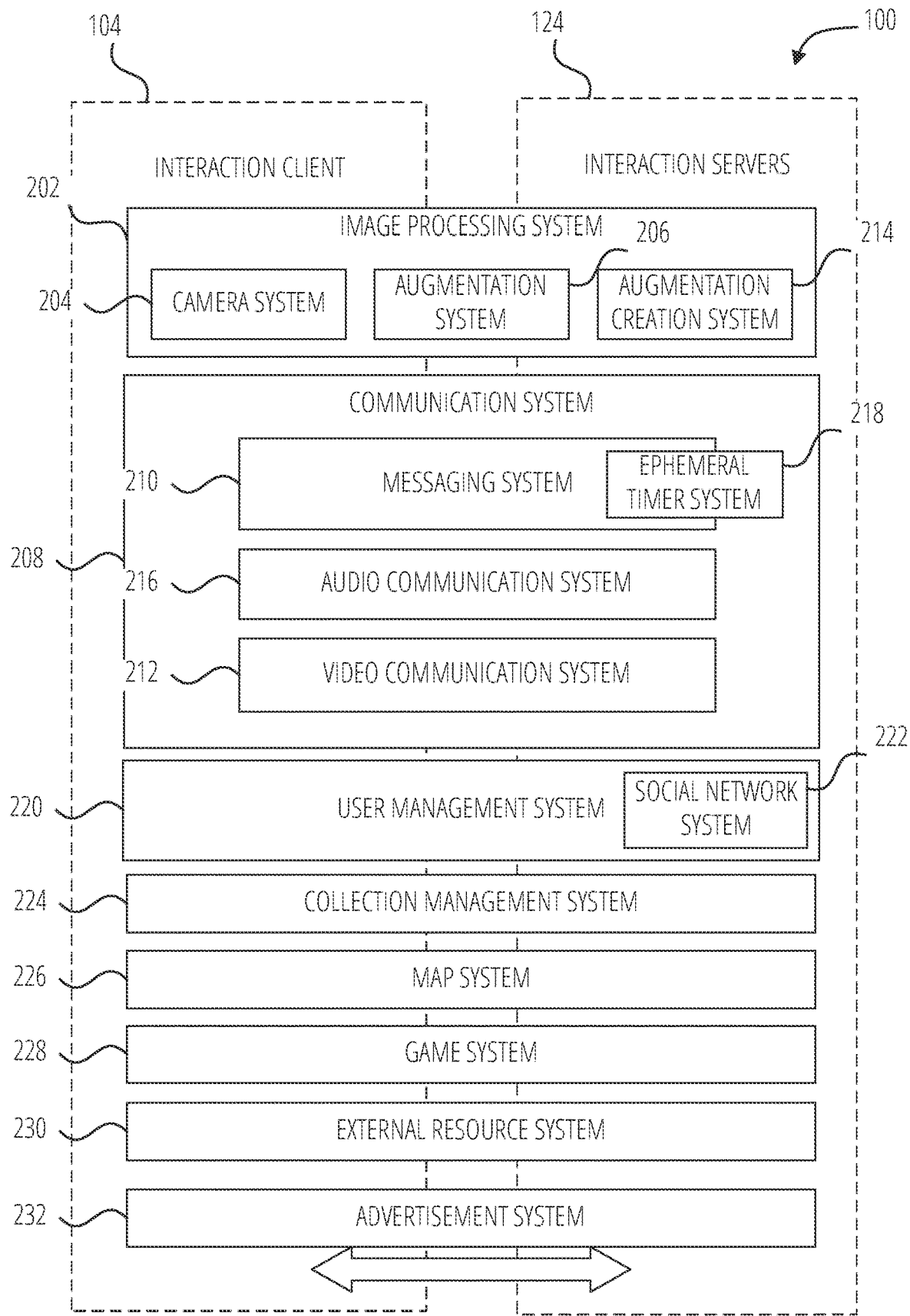
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:

Geolocation of the user system 102, and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
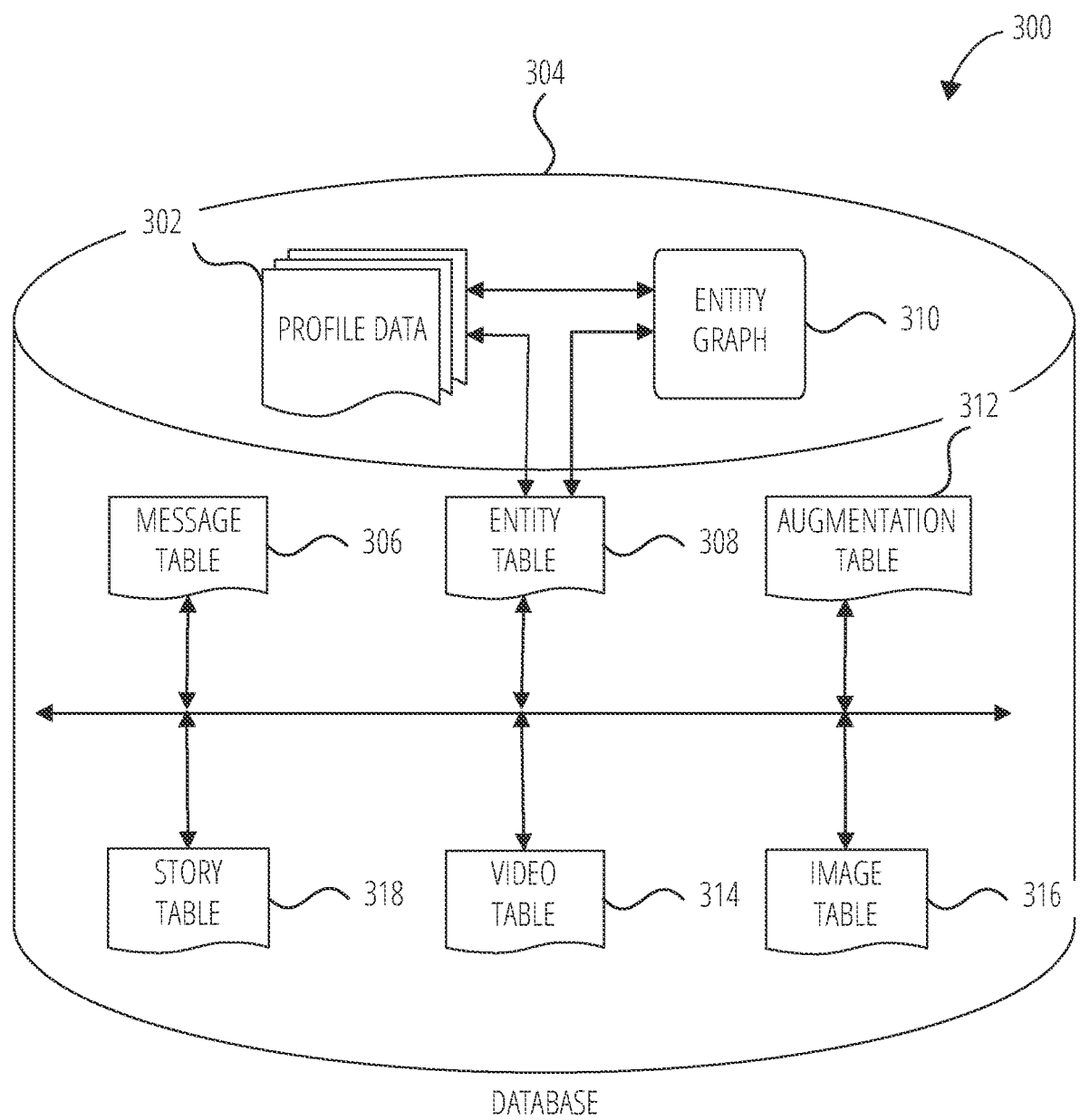
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
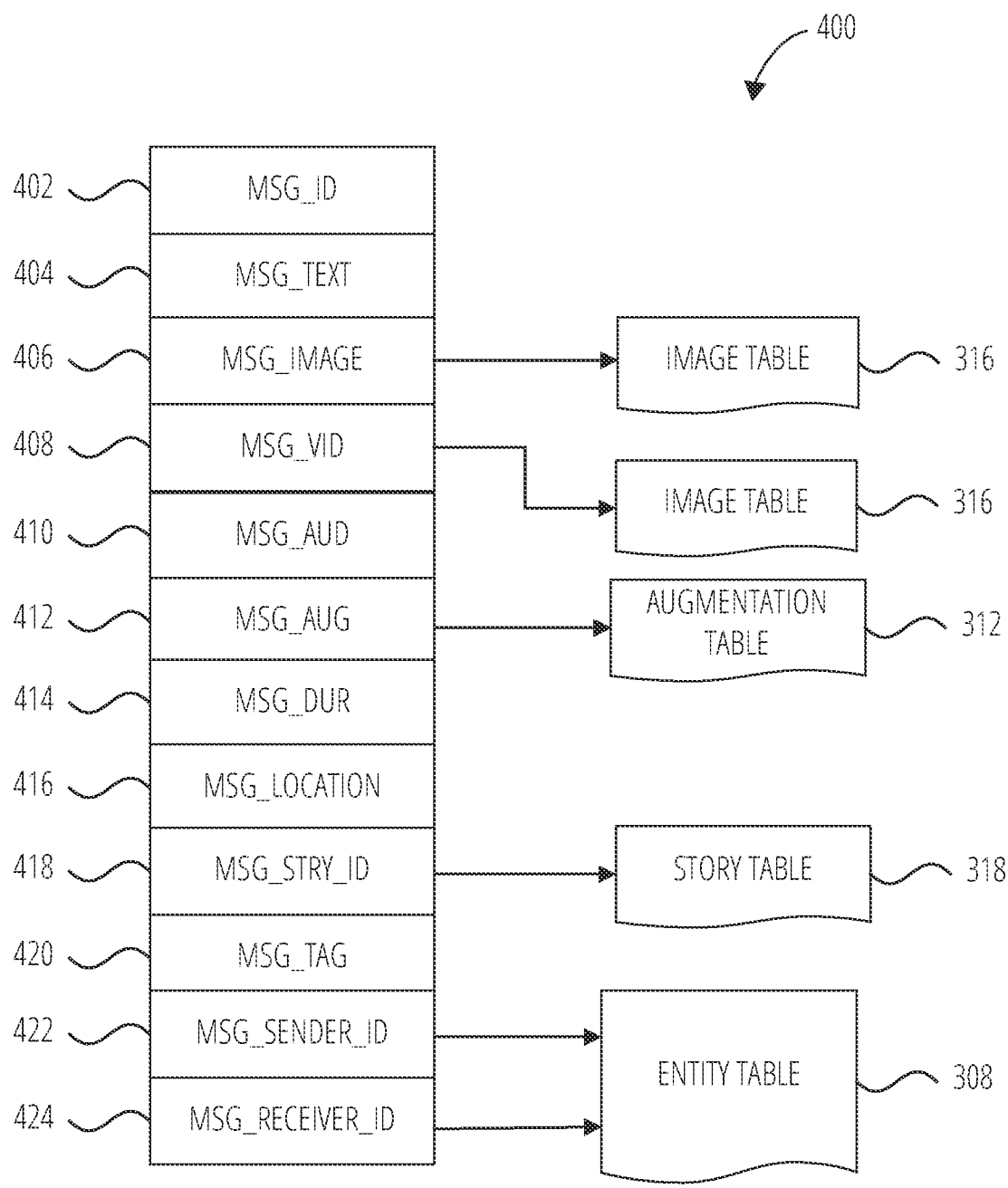
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Figure 5:
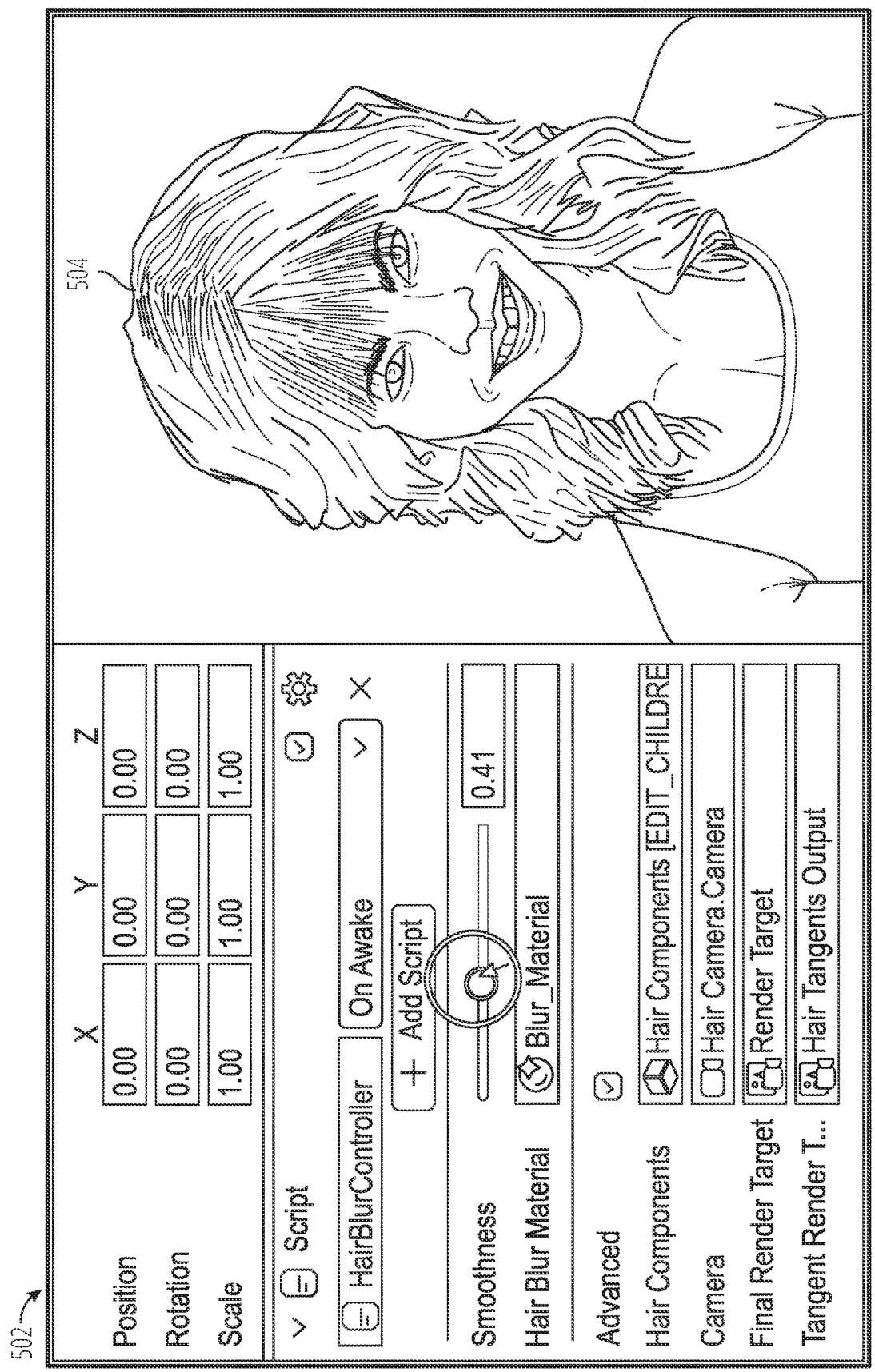
FIG. 5 illustrates an example interface of an application for developing an augmented reality content generator for generating virtual hair (e.g., for providing an AR experience for virtual hair on an image or video of a person).

FIG. 5 illustrates an example interface 502 of an application for developing an augmented reality content generator for generating virtual hair (e.g., for providing an AR experience for virtual hair on an image or video of a person).

In an embodiment, the application may be a program that enables editing of a given augmented reality content generated, including modification of various properties and interactive characteristics, including AR content, of a given augmented reality content generator.

As illustrated in the interface 502, various graphical elements are included to modify and configure various aspects of an AR content generator for hair generation. Information related to the AR content generator is shown in interface 502 including various parameters for configuring the AR content generator for hair generation. In this example, a selectable graphical item (e.g., slider element) has been selected to configure a smoothness parameter of the AR content generator. As also illustrated, a preview area showing virtual hair 504 based on the selected parameters.

The following discussion in FIG. 6 and FIG. 7 below relates to example architectures for using different encoders for projecting a given input image into a latent space for generating virtual content.

Figure 6:
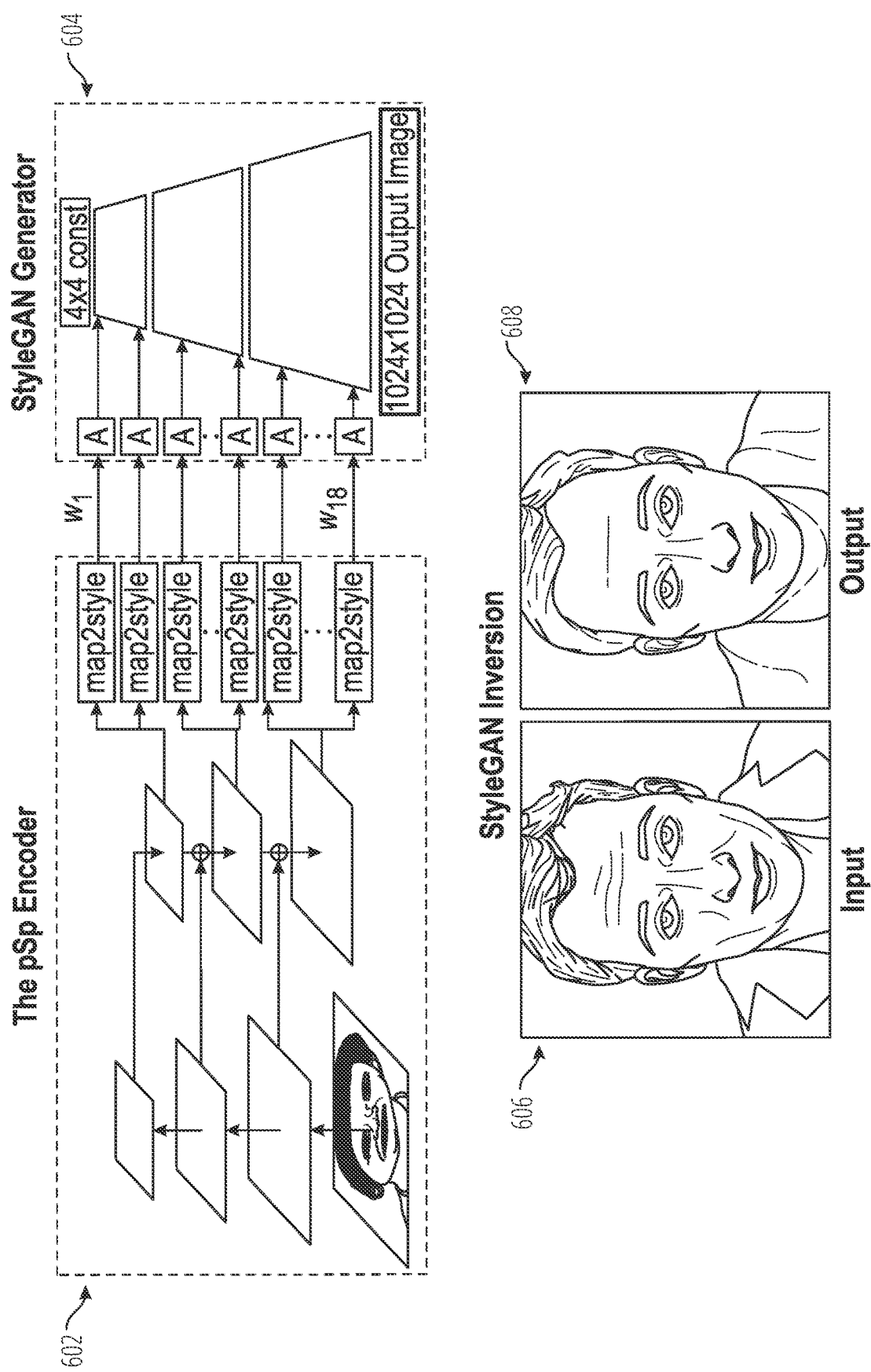
FIG. 6 illustrates an example processing flow of a computing architecture for projecting an input image into a latent space using a styleGAN (style generative adversarial network) generator in accordance with embodiments of the subject technology.

FIG. 6 illustrates an example processing flow of a computing architecture for projecting an input image 606 into a latent space using a styleGAN (style generative adversarial network) generator in accordance with embodiments of the subject technology. In an embodiment, the styleGAN generator can be a particular version of StyleGAN including a StyleGAN2 model. StyleGAN2 refers to a generative adversarial network that is based on StyleGAN with improvements including a normalization technique called weight demodulation, and improvements in training by focusing on low-resolution images and then shifting to higher resolutions without changing the network topology during training.

As shown, an encoder 602 (e.g., pixel2style2pixel (pSp) encoder) receives an input image 606, performs encoding of the input image 606, and provide the encoded image to styleGAN generator 604. Next, styleGAN generator 604 provides output image 608. In an embodiment, styleGAN generator 604 is based on a StyleGAN2 model.

In the pSp architecture of FIG. 6, an encoder backbone is extended with a feature pyramid that generates three levels of feature maps from which styles are extracted using an intermediate network e.g., map2style as shown in FIG. 6. The styles, aligned with the hierarchical representation, are then fed into the styleGAN generator 604 in correspondence to their scale to generate the output image 608, thus completing the translation from input pixels to output pixels, through the intermediate style feature representation. It is therefore understood that the pSp architecture is an end-to-end image-to-image translation framework.

Figure 7:
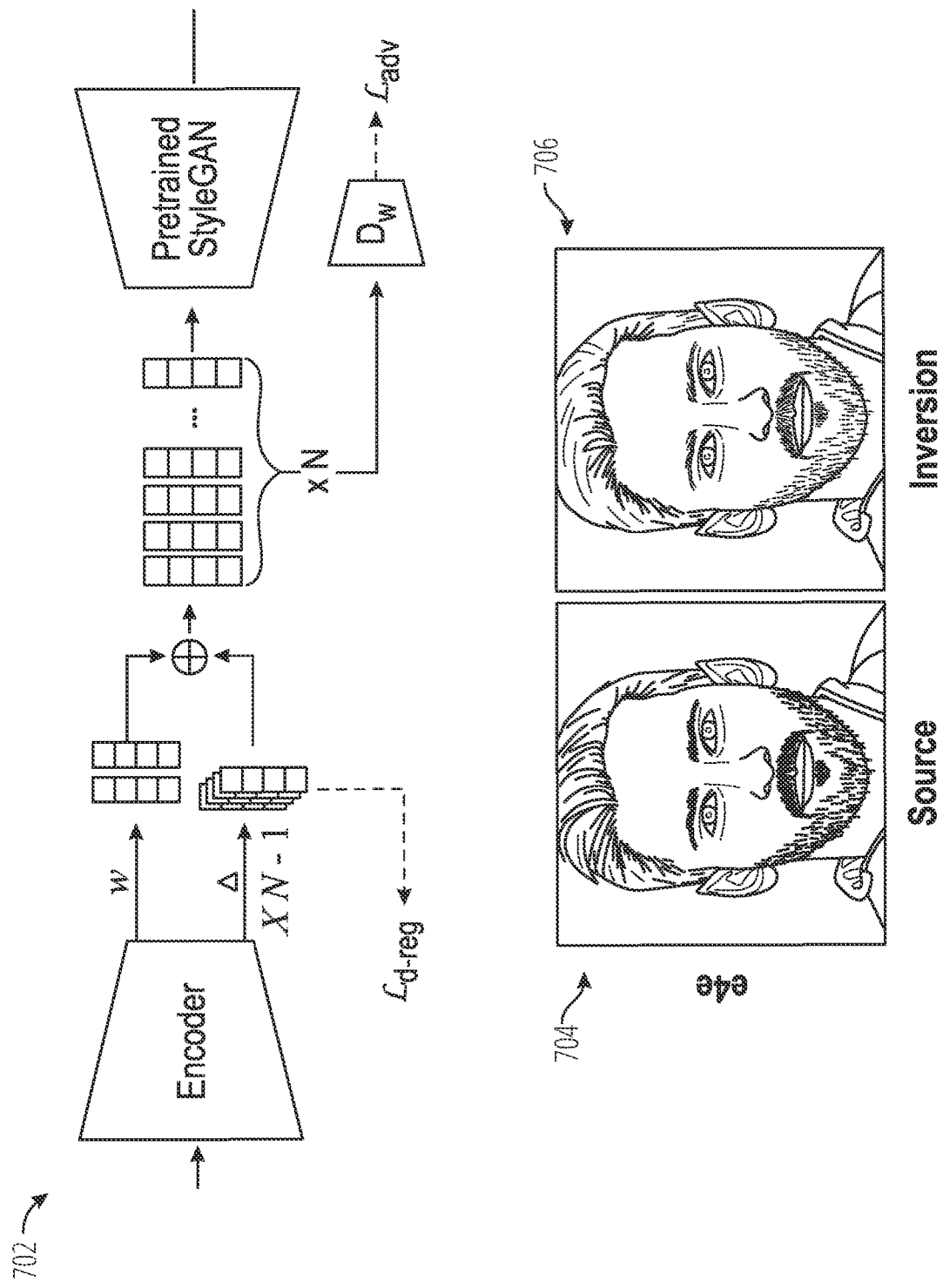
FIG. 7 illustrates another example processing flow of a computing architecture projecting an input image into a latent space using a styleGAN generator in accordance with embodiments of the subject technology.

FIG. 7 illustrates another example processing flow 702 of a computing architecture projecting an input image 704 into a latent space using a styleGAN generator in accordance with embodiments of the subject technology. In an embodiment, the styleGAN generator is based on a StyleGAN2 model.

As shown, an encoder (e.g., Encoder for Editing (e4e) encoder) receives an input image 704, performs encoding of the input image 704, and provide the encoded image to a pretrained styleGAN generator. Next, styleGAN generator provides output image 706.

In an implementation, the encoder receives an input image and outputs a single style code w together with a set of offsets $\Delta 1..\Delta N-1$, where N denotes the number of styleGAN's style modulation layers. A final latent representation can be determined by replicating the w vector by an N number of times and adding each Ai to its corresponding entry. During training, the $L_{d\text{-}reg}$ regularization encourages small variance between different entries of the final representation, thereby remaining close to W*. Also, $L_{adv}$ guides each latent code towards the range of styleGAN's mapping network, resulting in a final representation closer to $W^k$. As a result of applying both regularization terms, the encoder's final learned representation lies close to W.

In embodiments, the above encoders discussed in FIG. 6 and FIG. 7 are interchangeable and can be utilized in the place of the other encoder.

Figure 8:
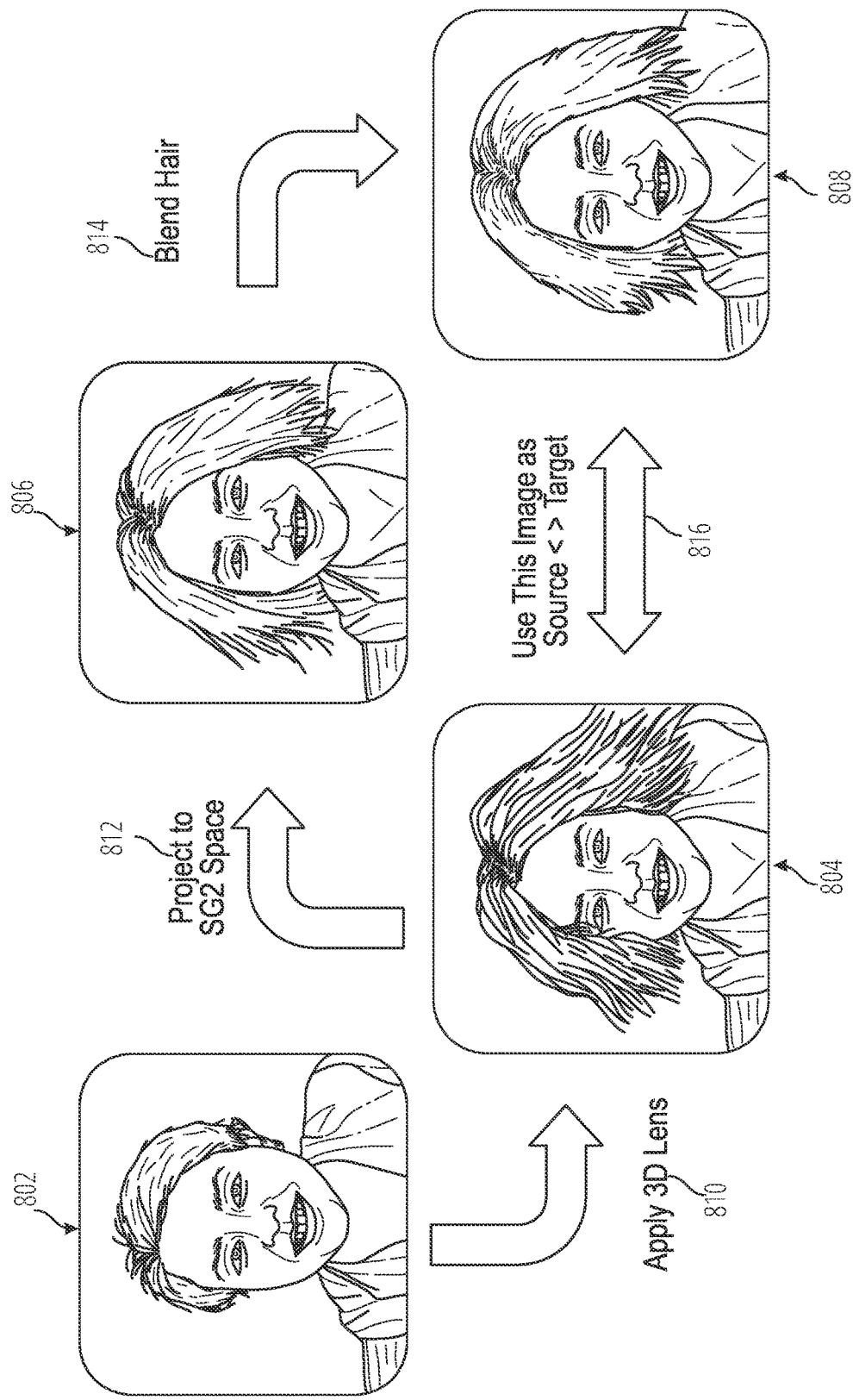
FIG. 8 illustrates an example processing flow for generating virtual hair in accordance with some embodiments of the subject technology.

FIG. 8 illustrates an example processing flow for generating virtual hair in accordance with some embodiments of the subject technology. In embodiments, the processing flow in FIG. 8 can be performed by computer client device 118. Alternatively (or conjunctively), the processing flow in FIG. 8 can be performed by interaction server system 110. For the purposes of discussion, the processing flow in FIG. 8 is described with respect to computer client device 118.

Initially, computer client device 118 generates at operation 802 a random image of a face using a pretrained StyleGAN model. In an implementation, although the StyleGAN model is mentioned in FIG. 8, it is appreciated that the model can be a particular version of StyleGAN including a StyleGAN2 model. As mentioned before, StyleGAN2 refers to a generative adversarial network that is based on StyleGAN with improvements including a normalization technique called weight demodulation, and improvements in training by focusing on low-resolution images and then shifting to higher resolutions without changing the network topology during training.

Next, computer client device 118 performs an operation 810 to apply 3D hair on the image generated by the StyleGAN model at operation 802 to generate an image 804. In an example, 3D hair will serve as a condition for dynamics and shape of realistically looking hair. Such 3D hair may be provided by an augmented reality content generator in an implementation.

At operation 812, computer client device 118 utilizes a pretrained neural network (e.g., pS or e4e architecture as described before in FIG. 6 and FIG. 7) that projects the image 804 into the StyleGAN2 latent space (e.g., generate the latent code for the StyleGAN2 latent space). An image 806 generated from such latent code will have realistic looking (virtual) hair that is similar to 3D hair in terms of shape and structure.

At operation 814, computer client device 118 blends realistic hair from image 806 to the image obtained at operation 802 to get an image 808 with a new realistic haircut that corresponds to the 3D hair generated in image 804. In an implementation, an image2image neural network is trained that will get as an input the image with applied 3D hair (e.g., image 804) and will output the same face but with realistic hair instead of 3D hair.

At operation 816, this model is utilized in real-time for realistic hair generation, first 3D hair is applied on the face (e.g., at operation 810) and then the neural network model creates from that image the image with realistic hair.

Figure 9:
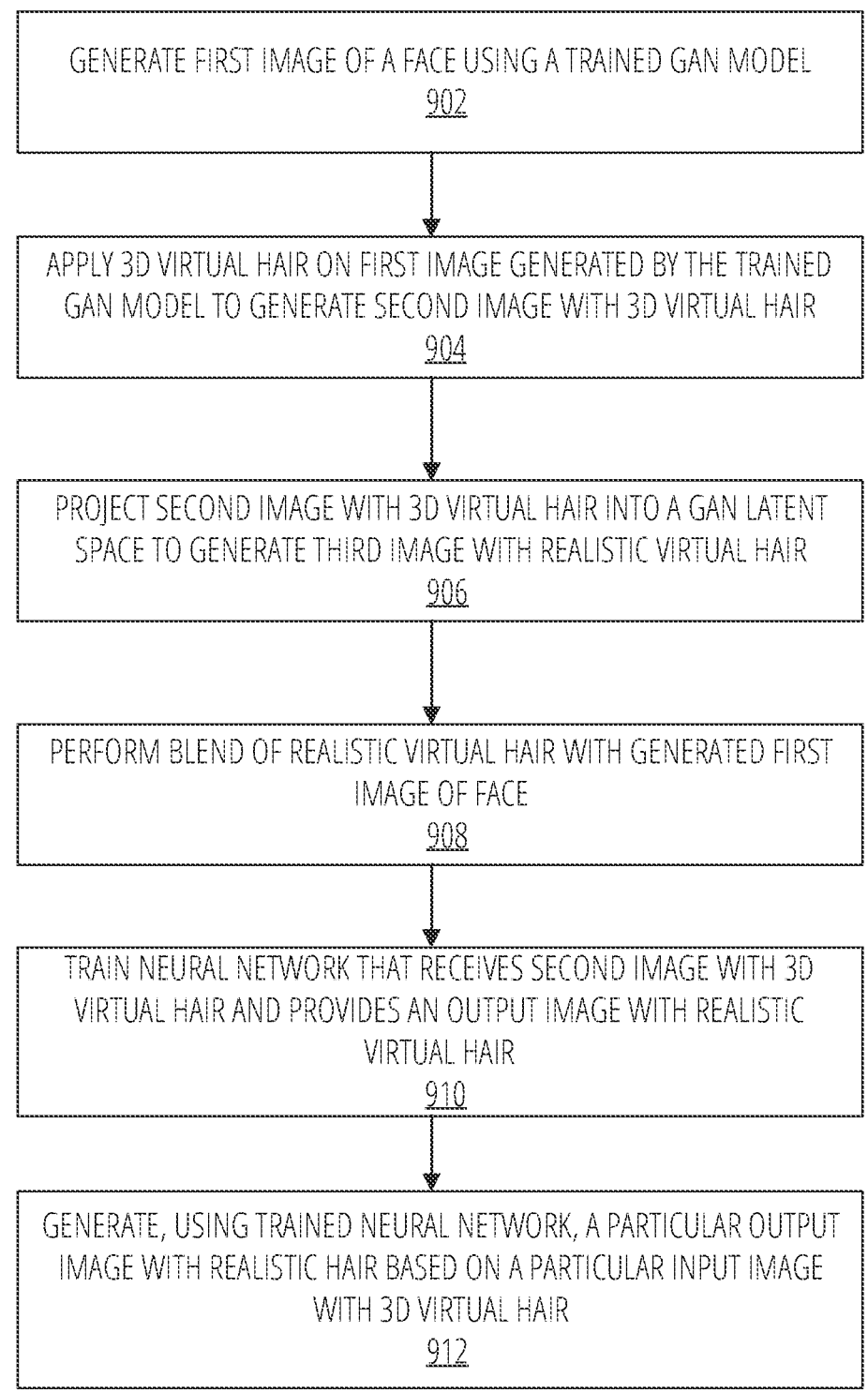
FIG. 9 is a flowchart illustrating a method, according to certain example embodiments.

FIG. 9 is a flowchart illustrating a method 900, according to certain example embodiments. The method 900 may be embodied in computer-readable instructions for execution by one or more computer processors such that the operations of the method 900 may be performed in part or in whole by computer client device 118. However, it shall be appreciated that at least some of the operations of the method 900 may be deployed on various other hardware configurations and the method 900 is not intended to be limited to computer client device 118 or any components or systems mentioned above.

According to some examples, at operation 902, computer client device 118 generates a first image of a face using a trained generative adversarial network (GAN) model. In an example, the trained GAN model comprises a StyleGAN2 model.

At operation 904, computer client device 118 applies three-dimensional (3D) virtual hair on the first image generated by the trained GAN model to generate a second image with 3D virtual hair. In an example, applying the 3D virtual hair is based on an augmented reality (AR) content generator that utilizes a different process for generating 3D virtual hair than the trained neural network.

At operation 906, computer client device 118 projects the second image with 3D virtual hair into a GAN latent space to generate a third image with realistic virtual hair. In an example, the GAN latent space comprises a compressed representation of data. In an example, projecting the second image with 3D virtual hair into the GAN latent space is based on a pixel2style2pixel (pSp) encoder or an Encoder for Editing (e4e) encoder.

At operation 908, computer client device 118 performs a blend of the realistic virtual hair with the generated first image of the face to generate a new image with new realistic hair that corresponds to the 3D virtual hair. In an example, performing the blend is based on one or more of a Gaussian blending, Laplacian blending, edge detection, Poisson blending, or gradient mixing.

At operation 910, computer client device 118 trains a neural network that receives the second image with the 3D virtual hair and provides an output image with realistic virtual hair. In an example, the neural network comprises a deep neural network. In an example, the deep neural network comprises an image2image neural network.

At operation 912, computer client device 118 generates using the trained neural network, a particular output image with realistic hair based on a particular input image with 3D virtual hair. In an example, the particular input image is a different image from the first image of the face. In an example, particular output image with realistic hair is a different image than the new image with the new realistic hair.

Machine Architecture

Figure 10:
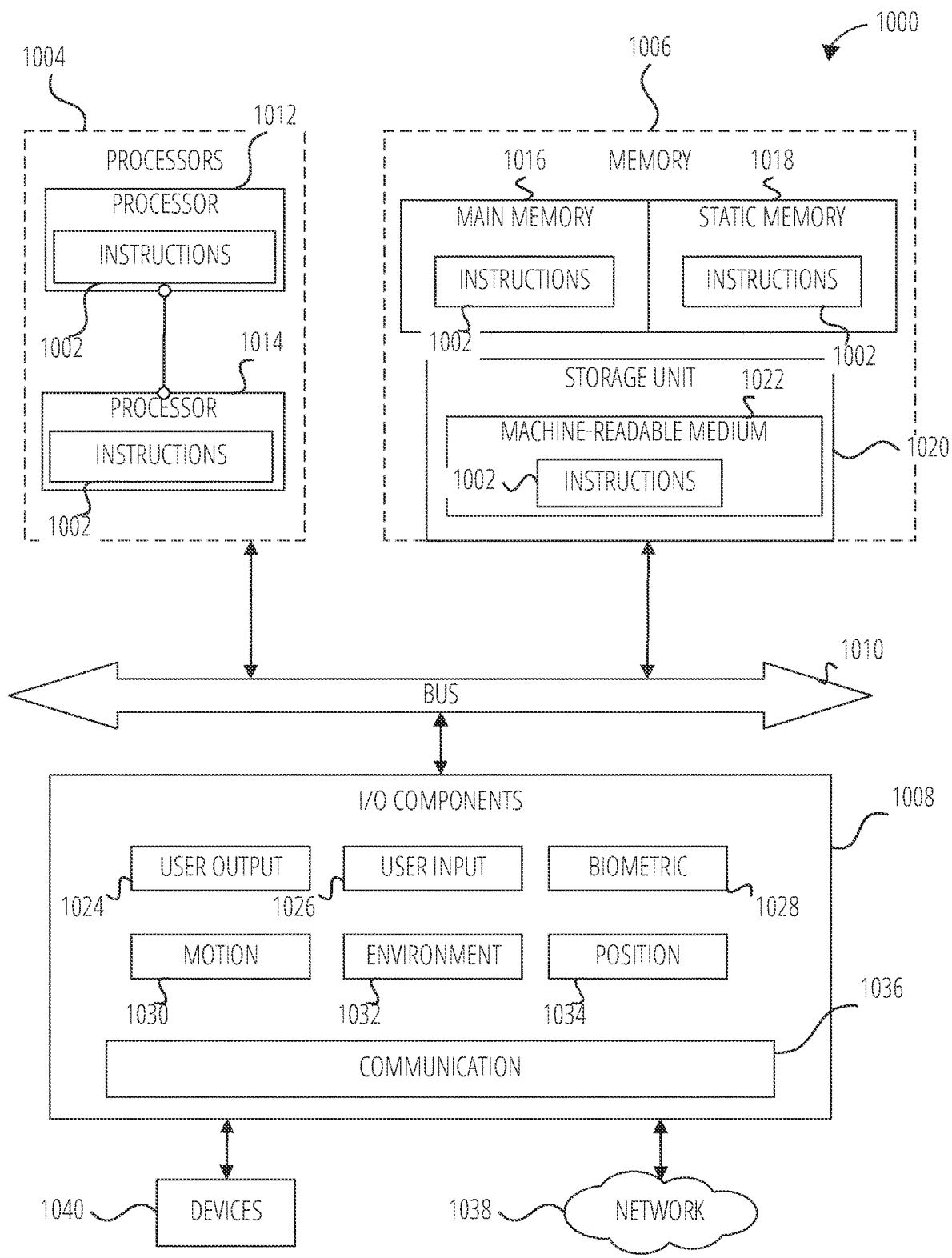
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
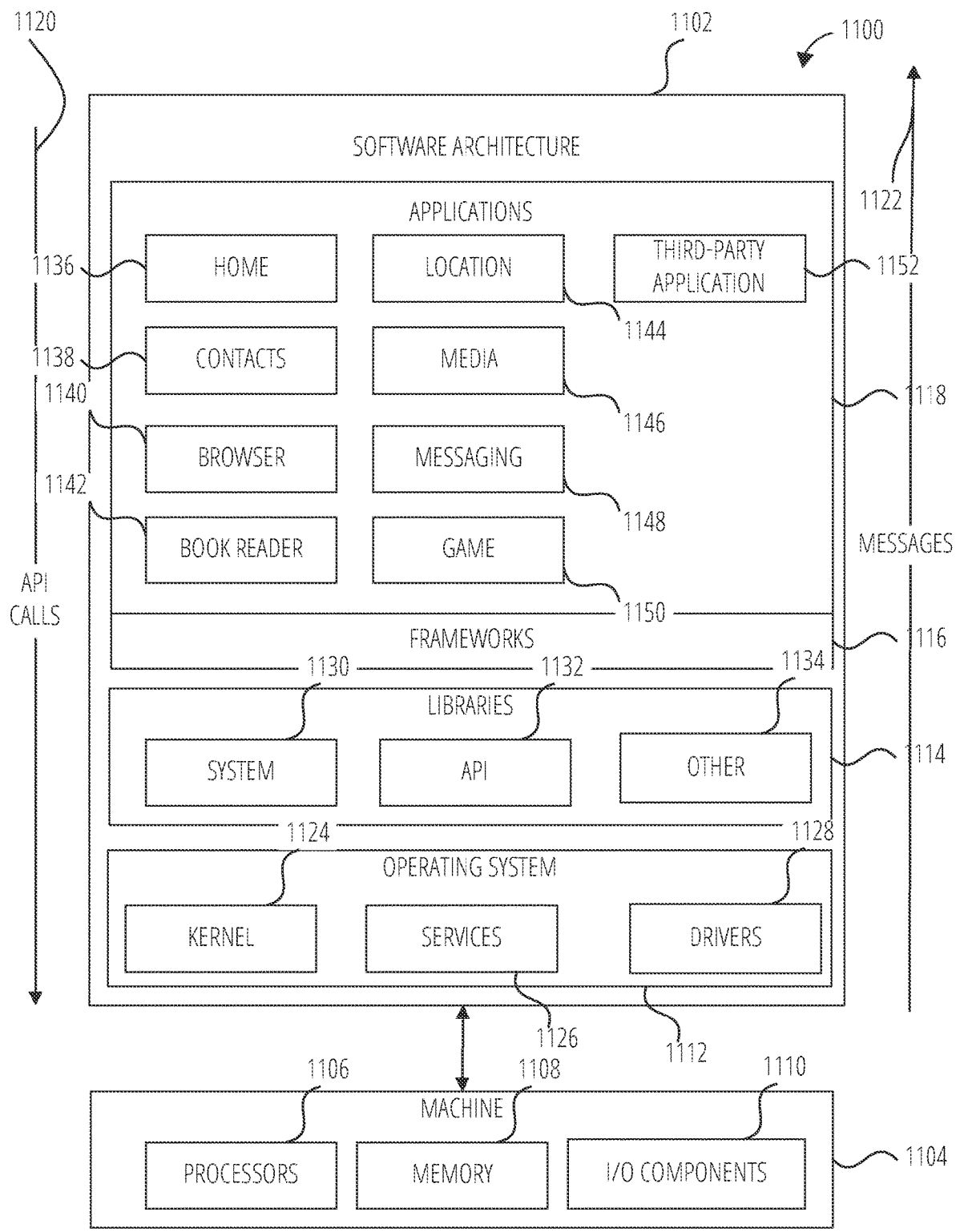
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A method, comprising:
generating, by one or more hardware processors, a first image of a face using a trained generative adversarial network (GAN) model;
applying, by the one or more hardware processors, three-dimensional (3D) virtual hair on the first image generated by the trained GAN model to generate a second image with 3D virtual hair;
projecting, by the one or more hardware processors, the second image with 3D virtual hair into a GAN latent space to generate a third image with virtual hair;
performing, by the one or more hardware processors, a blend of the virtual hair with the generated first image of the face to generate a new image with new hair that corresponds to the 3D virtual hair;
training, by the one or more hardware processors, a neural network that receives the second image with the 3D virtual hair and provides an output image with virtual hair; and
generating, by the one or more hardware processors, using the trained neural network, a particular output image with hair based on a particular input image with 3D virtual hair.

2. The method of claim 1, wherein the trained GAN model comprises a StyleGAN2 model.

3. The method of claim 2, wherein applying the 3D virtual hair is based on an augmented reality (AR) content generator that utilizes a different process for generating 3D virtual hair than the trained neural network.

4. The method of claim 3, wherein the GAN latent space comprises a compressed representation of data.

5. The method of claim 1, wherein performing the blend is based on one or more of a Gaussian blending, Laplacian blending, edge detection, Poisson blending, or gradient mixing.

6. The method of claim 1, wherein the neural network comprises a deep neural network.

7. The method of claim 6, wherein the deep neural network comprises an image2image neural network.

8. The method of claim 1, wherein projecting the second image with 3D virtual hair into the GAN latent space is based on a pixel2style2pixel (pSp) encoder or an Encoder for Editing (e4e) encoder.

9. The method of claim 1, wherein the particular input image is a different image from the first image of the face.

10. The method of claim 1, wherein the particular output image with hair is a different image than the new image with the new hair.

11. A system comprising:
a processor, and
a memory including instructions that, when executed by the processor, cause the processor to perform operations comprising:
generating a first image of a face using a trained generative adversarial network (GAN) model;
applying, three-dimensional (3D) virtual hair on the first image generated by the trained GAN model to generate a second image with 3D virtual hair;
projecting, the second image with 3D virtual hair into a GAN latent space to generate a third image with virtual hair;
performing, a blend of the virtual hair with the generated first image of the face to generate a new image with new hair that corresponds to the 3D virtual hair;
training, a neural network that receives the second image with the 3D virtual hair and provides an output image with virtual hair; and
generating, using the trained neural network, a particular output image with hair based on a particular input image with 3D virtual hair.

12. The system of claim 11, wherein the trained GAN model comprises a StyleGAN2 model.

13. The system of claim 12, wherein applying the 3D virtual hair is based on an augmented reality (AR) content generator that utilizes a different process for generating 3D virtual hair than the trained neural network.

14. The system of claim 13, wherein the GAN latent space comprises a compressed representation of data.

15. The system of claim 11, wherein performing the blend is based on one or more of a Gaussian blending, Laplacian blending, edge detection, Poisson blending, or gradient mixing.

16. The system of claim 11, wherein the neural network comprises a deep neural network.

17. The system of claim 16, wherein the deep neural network comprises an image2image neural network.

18. The system of claim 11, wherein projecting the second image with 3D virtual hair into the GAN latent space is based on a pixel2style2pixel (pSp) encoder or an Encoder for Editing (e4e) encoder.

19. The system of claim 11, wherein the particular input image is a different image from the first image of the face.

20. A non-transitory computer-readable medium comprising instructions, which when executed by a computing device, cause the computing device to perform operations comprising:

generating, by one or more hardware processors, a first image of a face using a trained generative adversarial network (GAN) model;

applying, by the one or more hardware processors, three-dimensional (3D) virtual hair on the first image generated by the trained GAN model to generate a second image with 3D virtual hair;

projecting, by the one or more hardware processors, the second image with 3D virtual hair into a GAN latent space to generate a third image with virtual hair;

performing, by the one or more hardware processors, a blend of the virtual hair with the generated first image of the face to generate a new image with new hair that corresponds to the 3D virtual hair;

training, by the one or more hardware processors, a neural network that receives the second image with the 3D virtual hair and provides an output image with virtual hair; and generating, by the one or more hardware processors, using the trained neural network, a particular output image with hair based on a particular input image with 3D virtual hair.

* * * * *

UNITED STATES PATENT AND TRADEMARK OFFICE
CERTIFICATE OF CORRECTION

PATENT NO. : 12,277,639 B2  
APPLICATION NO. : 18/149007  
DATED : April 15, 2025  
INVENTOR(S) : Belskikh et al.

Page 1 of 1

It is certified that error appears in the above-identified patent and that said Letters Patent is hereby corrected as shown below:

In the Claims

In Column 24, Line 45, Claim 11, delete "processor," and insert --processor;-- therefor Signed and Sealed this  
Thirtieth Day of December, 2025

John A. Squires  
*Director of the United States Patent and Trademark Office*